April 11, 1967 S. P. V. PIATTI 3,313,127
UNIVERSAL JOINTS

Filed Jan. 15, 1965 3 Sheets-Sheet 2

Inventor
S. P. V. Piatti

By
Attorneys

United States Patent Office 3,313,127
Patented Apr. 11, 1967

3,313,127
UNIVERSAL JOINTS
Sanzio Pio Vincenzo Piatti, 14 Corso Porta Nuova,
Milan, Italy
Filed Jan. 15, 1965, Ser. No. 425,877
Claims priority, application Italy, Jan. 20, 1964,
1,380/64
7 Claims. (Cl. 64—17)

The present invention relates to universal joints which couple together rotatable members in such a way that the axes of rotation of the two members may be inclined relative to each other, whilst the members are in driving connection.

More particularly the invention relates to universal joints in which the adjacent ends of the members are each provided with a fork, the two forks being coupled together by a coupling element in the form of a cross.

The two limbs of the cross are at right angles to each other, and one limb is connected for rocking movement to the fork of one member whilst the other limb is connected for rocking movement to the other member.

In one such form of universal joint in common use the coupling element takes the form of a forging, the ends of the limbs being machined to form stub shafts about which the forks of input and output members rock. Coupling elements of this type have the disadvantage that they are complicated and costly to produce since the stub shafts are integral with the forging of the coupling element and each stub shaft has to be separately machined or ground. The stub shafts are generally mounted in needle bearings in aligned apertures in each fork and, to enable the coupling element to be fitted between the forks with the stub shafts in the aligned apertures therein it is necessary for the inwardly facing surfaces of each fork to be inclined to the axis of the apertures and spaced apart by a considerably greater distance than the distance between the inner ends of two opposing stub shafts. Consequently, the needle bearings, when fitted in the apertures, project inwardly out of the forks. It is therefore necessary to provide the needle bearings with cages or cups strong enough to be self-supporting where they project from the forks. Due to the spacing between the forks it is impracticable to provide bearing surfaces between the inwardly facing surfaces of the forks and the central part of the coupling element to resist lateral thrust, and such thrust is usually taken up by the end caps of the bearing cage which are engaged by the outer ends of the stub shafts. Such an arrangement necessitates strengthening the end caps of the bearing cages.

One improved construction of universal joints which avoids the above disadvantages forms the subject of applicant's United States Patent No. 3,103,798. The cruciform coupling element of the universal joint described therein comprises a body portion provided with two intercommunicating bores extending therethrough with the axes thereof disposed at right angles to one another. This body portion is positioned between the arms of the forks, which fit closely therearound, whereafter pins, about which the input and output members rock, are passed through the aligned apertures in the forks and are forced into the bores, at least some of the pins being expanded within their associated bores to secure them in place. Needle bearings are then inserted into the apertures in the forks around the ends of the pins, the bearings being wholly supported by the forks, and any lateral thrust being accommodated by engagement between the adjacent surfaces of the body portion and the forks or by thrust washers disposed between these surfaces.

This improved joint, however, possesses the disadvantage that it is impracticable to provide an axial passage through the body portion, which is required in some types of joints, for example in certain types of constant velocity joint in order to permit a centering element carried by one of the forks or members to project therethrough, or to allow for the passage of wires. The provision of such an axial passage necessitates shortening the bores and the portions of the pins disposed within the bores; and to ensure that such pins are securely and permanently held within their bores when subjected to working loads, the interference fit between the pins and bores must be such that considerable pressure is applied to the pins to insert them. Under some conditions it has been found that this pressure tends to distort the pins.

The present invention provides an improved construction of the universal joint which avoids the previously mentioned disadvantages.

The present invention consists in a universal joint in which a pair of forked members are coupled together by a coupling element in the form of a cross, the cross comprising a body portion having bores into which pins are inserted with a frictional fit, wherein axial movement of a pin in its bore is restricted by deformation of the material of the body portion at an end of the bore to engage a reduced diameter portion of the pin.

In order that the invention may be more readily understood, reference will now be made to the accompanying drawings in which.

Figure 1:
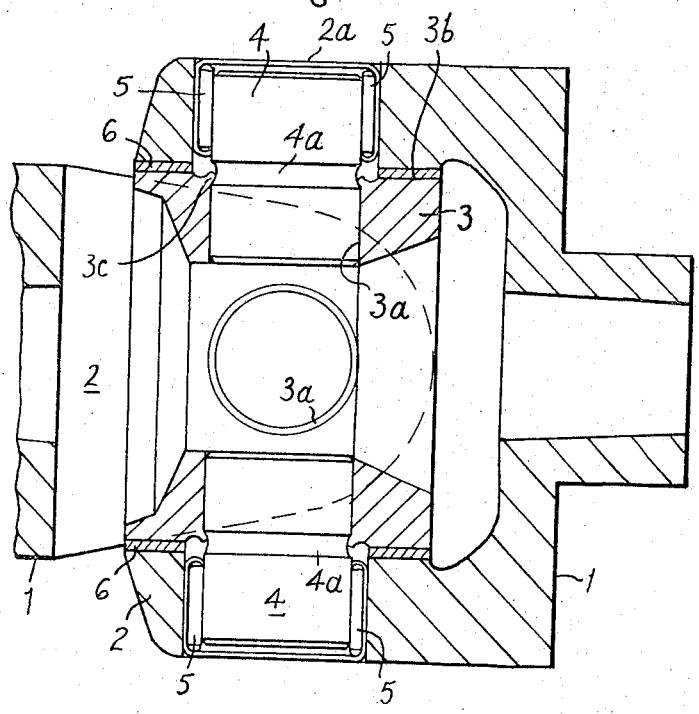
FIGURE 1 is an axial section of a universal joint, having parts thereof cut away, according to one embodiment of the invention.

Refering to FIGURE 1, the universal joint comprises input and output members 1 provided with forks 2 each having a pair of aligned apertures 2a in the arms thereof. A coupling element is located between both forks 2, and includes a hollow body portion 3 in the form of a ring having two sets of bores 3a, the axes of which are at right angles to and intersect each other. The surfaces 3b of the body portion surrounding the outer ends of the bores may be machined to form bearing surfaces.

Pressed into each bore 3a is a pin 4 having a circumferential groove or recess 4a which lies partially within the bore 3a. The pin is axially secured by a deformed annular portion 3c of the body portion 3 which engages within the recess 4a. The outer end of each pin 4 projects into one of the apertures 2a in the forks 2, and a needle bearing 5, for example of the type manufactured by the Torrington Co. Ltd. of Coventry, England, is located around the outer end of the pin 4 within the aperture 2a. A thrust washer 6 is located around the pin 4, between the body portion 3 and the fork 2.

Figure 2:
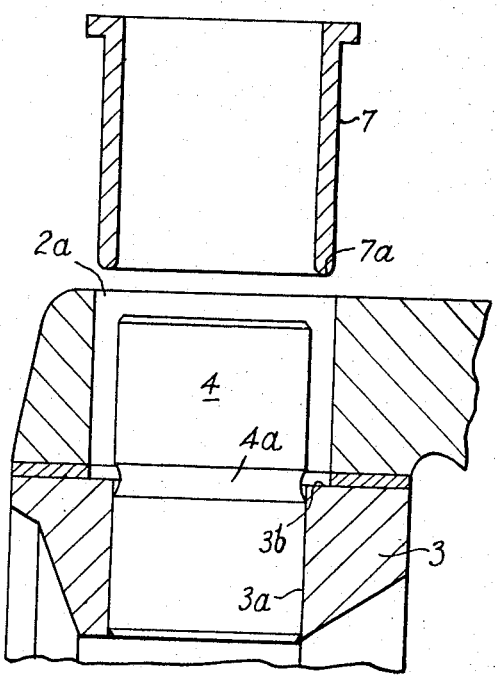
FIGURE 2 is a section of a part of the joint of FIGURE 1, during assembly of the joint, prior to the deformation of the body portion to secure a pin therein.
Figure 3:
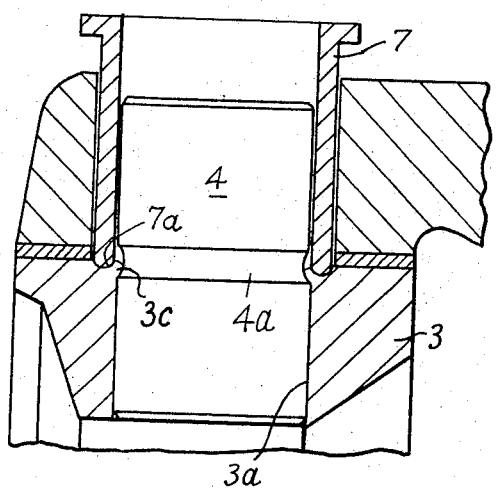
FIGURE 3 shows the part of FIGURE 2 during deformation of the body portion.

To assemble the joint, the body portion 3 is placed between one of the forks with one of the bores 3a in line with the apertures 2a therein and the thrust washer 6 in position. A pin 4 is then passed through each aperture 2a in each arm of the fork, and is pressed into its associated bore 3a to the position shown in FIGURE 2. A tubular tool 7 having an inclined or rounded lower end 7a is then passed over the pin 4 into the space between the pin 4 and aperture 2a, until the end 7a engages the body portion 3 adjacent the pin, and is pressed or bumped to deform the material of the body portion into the recess 4a as shown in FIGURE 3. The tool 7 is then withdrawn, and the needle bearing 5 inserted in the space previously occupied by the tool as shown in FIGURE 1.

This procedure is carried out for all four pins about which the input and output forks 2 rock.

Figure 4:
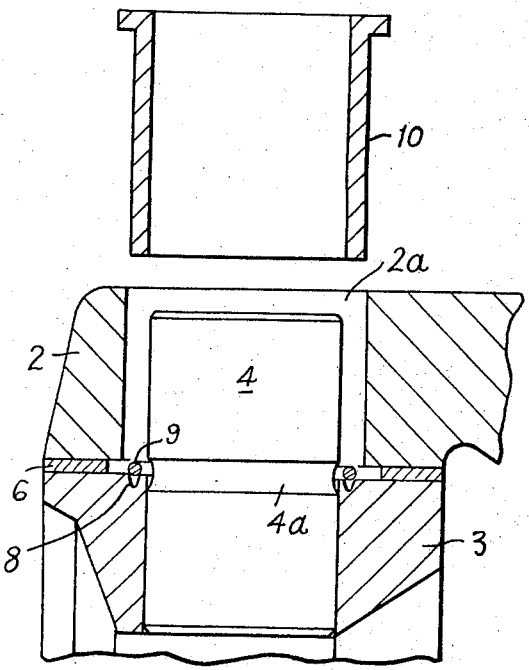
FIGURES 4 and 5 are views similar to FIGURES 2 and 3, of a modification of the invention.
Figure 5:
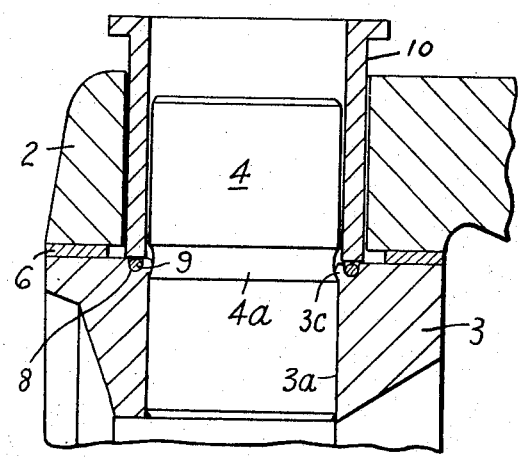

In the embodiment shown in FIGURES 4 and 5, which is particularly but not solely applicable to body portions formed by a soft metal, such as a zinc base alloy, the body portion 3 is preformed with an annular channel 8 around and adjacent the outer end of each bore 3a. A ring 9 of steel wire is located in the open end of each channel 8 as shown in FIGURE 4 which, after the pin has been pressed into the bore 3a to correct depth, is forced into the channel 8 by a flat ended tool 10 to deform an annular portion 3c of the body portion into the recess 4a. The ring 9 may remain trapped in the channel 8, which provides additional resistance against the metal portion 3d being displaced out of the recess 4a by any axial force on the pin.

With the universal joints hereinbefore described, since the body portion 3 is placed in position between the arms of the forks of the input and output members before the pins 4 are inserted, the inner faces of the forks can be perpendicular to the axis of the apertures therein and can be spaced closer together than in prior constructions, and can, therefore, completely surround and support the needle bearing, thereby permitting needle bearings having less robust cages or caps to be used. Moreover, the inwardly facing surfaces of the forks form bearing surfaces to absorb lateral thrust from the surfaces 3b of the body portion 3 through the washer 6., By axially securing the pins in the body portion as described, the pressure required to insert the pins into their respective bores can be reduced to a value below that which may produce distortion of the pins and/or the coupling element, since the interference between the pins and their bores is no longer the sole means of axial fixing.

When the body portion is hollow, i.e. in the form of a ring, it may be supported internally while a pin is being inserted and the body portion deformed.

It will be understood that various modifications may be made without departing from the scope of the present invention as defined in the appended claims. For example, although, a simple universal joint has been specifically described, the invention is also applicable to complex joints, for example to constant velocity joints. In this case one of the forked members will comprise one of the input or output members whilst the other member to which it is coupled by the coupling element will comprise an intermediate member of the joint, which is, in turn, coupled to the other of the output or input members of the joint.

The material of the body portion adjacent each pin may be preformed with a shallow annular recess or channel, for example, similar to the channel shown in FIGURES 4 and 5, with which the rounded or inclined peripheral edge of the tool directly engages to deform the body portion. Moreover, the recess in each pin may be replaced by a step produced by reducing the diameter of the outer projecting part of a pin. The metal of the body portion is peened over the step to secure the pin in position.

I claim:

1. A universal joint in which a pair of forked members are coupled together by a coupling element in the form of a cross, said cross comprising a body portion having bores into which pins are inserted with a frictional fit, wherein axial movement of a pin in its bore is restricted by deformation of the material of said body portion at the outer end of said bore into engagement with a reduced diameter, circumferentially extending portion of said pin positioned to be located adjacent the outer end of said bore when said pin is inserted therein.

2. A universal joint according to claim 1, wherein said reduced diameter portion of said pin comprises a circumferentially continuous recess positioned to be located partly within the outer end of said bore when said pin is inserted therein.

3. A universal joint according to claim 2, wherein thrust forces in the direction of the axes of the pins are absorbed between generally parallel opposed faces of the said body portion and said forks, and wherein the outer ends of said pins are mounted in needle bearings in said forks.

4. A universal joint comprising first and second forks coupled together by a coupling element in the form of a cross, wherein the arms of each fork have aligned apertures therein, and each said aperture has therein a bearing comprising a plurality of rollers assembled in a cage, said coupling element comprising a body portion having bores extending therethrough with their axes intersecting at right angles, cylindrical pins frictionally engaged in said bores with their outer ends projecting from said body portion, the outer ends disposed on one axis being located within said bearings in one fork and the outer ends disposed on the other axis being located within said bearings in the other fork, a circumferentially extending recess in the surface of a pin and located partly within the outer end of the bore containing said pin, and a deformed portion of said body portion at said outer end of the bore engaging in said circumferentially extending recess in said pin to restrict axial movement of said pin within its bore.

5. A unversal joint according to claim 4, wherein the body portion comprises a ring formed with a central passage extending therethrough in the direction of its axis of rotation, and with two pairs of bores therein, the bores of one pair being aligned on an axis intersecting the axis of the other pair of bores at right angles, each bore being of substantially uniform diameter throughout its axial length, four cylindrical pins of substantially uniform diameter along their axial length, which diameter is such that the pins are frictionally retained, one within and projecting outwardly from, each bore, a circumferentially extending recess in the surface of each pin and located partly within the outer end of its associated bore, and a deformed portion of the body portion at the outer end of each bore extending into and engaging said recess in its associated pin.

6. A universal joint according to claim 5, wherein said body portion fits closely between the arms of the input and output forks, and wherein generally parallel opposing faces are provided on adjacent surfaces of the body portion and forks to absorb any thrust forces in the direction of the axes of the pins, said adjacent surfaces being separated by a thrust washer.

7. A universal joint according to claim 5, including an annular channel in the outer surface of said body portion surrounding and concentric with each deformed portion, and a steel ring trapped within each channel.

References Cited by the Examiner
UNITED STATES PATENTS

| | | | |
|---|---|---|---|
| 2,873,591 | 2/1959 | Stillwagon | 64—17 |
| 2,903,868 | 9/1959 | Stillwagon | 64—17 |
| 3,103,798 | 9/1963 | Piatti | 64—17 |

FRED C. MATTERN, Jr., *Primary Examiner.*

HALL C. COE, *Examiner.*